US012791848B1

(12) United States Patent
Kaczmarek et al.

(10) Patent No.: US 12,791,848 B1
(45) Date of Patent: Nov. 10, 2026

(54) TELESCOPE CALIBRATION SYSTEM

(71) Applicant: CAES Systems LLC, Arlington, VA (US)

(72) Inventors: Bruce Kaczmarek, Lansdale, PA (US); Rik Maeda, Lansdale, PA (US); Stephen Semuskie, Lansdale, PA (US)

(73) Assignee: CAES Systems LLC, Arlington, VA (US)

( * ) Notice: Subject to any disclaimer, the term of this patent is extended or adjusted under 35 U.S.C. 154(b) by 787 days.

(21) Appl. No.: 18/313,082

(22) Filed: May 5, 2023

(51) Int. Cl.

| | |
|---|---|
| ***G02B 23/06*** | (2006.01) |
| ***B64G 3/00*** | (2006.01) |
| ***G01S 7/497*** | (2006.01) |
| ***G01S 17/66*** | (2006.01) |
| ***G02B 7/182*** | (2021.01) |
| *G01C 25/00* | (2006.01) |

(52) U.S. Cl.
CPC ............... *G02B 23/06* (2013.01); *B64G 3/00* (2013.01); *G01S 7/497* (2013.01); *G01S 17/66* (2013.01); *G02B 7/1824* (2013.01); *G01C 25/00* (2013.01)

(58) Field of Classification Search
None
See application file for complete search history.

(56) References Cited

U.S. PATENT DOCUMENTS

| | | | | |
|---|---|---|---|---|
| 6,020,955 | A * | 2/2000 | Messina | F41G 3/326 356/138 |
| 2003/0044058 | A1* | 3/2003 | Tada | G03F 1/84 382/145 |
| 2005/0088760 | A1* | 4/2005 | Mann | G02B 17/0663 359/730 |
| 2006/0164724 | A1* | 7/2006 | Nagata | G01C 3/04 359/399 |
| 2007/0075237 | A1* | 4/2007 | Mills | G01S 7/495 250/239 |
| 2013/0070238 | A1* | 3/2013 | Fasse | G01S 7/486 356/138 |
| 2014/0248049 | A1* | 9/2014 | Saint Georges | H04B 10/1125 398/115 |
| 2017/0366264 | A1* | 12/2017 | Riesing | H04B 10/615 |
| 2020/0386303 | A1* | 12/2020 | Fanelli | F16H 55/18 |

* cited by examiner

*Primary Examiner* — Hovhannes Baghdasaryan
(74) *Attorney, Agent, or Firm* — Alston & Bird LLP

(57) ABSTRACT

Systems, apparatuses, telescope products and methods for calibrating telescope systems are provided. Specifically, a telescope system and calibration techniques are provided that allow for the establishment of a system invariant point that co-aligns a gimbal invariant point with a telescope invariant point to identify a center of a telescope system. A telescope system includes a telescope assembly, a gimbal assembly, and a payload platform. The payload platform includes a plurality of mechanical adjusters operable to align a gimbal invariant point of the gimbal assembly and a telescope invariant point of the telescope assembly to establish the system invariant point.

18 Claims, 10 Drawing Sheets

TELESCOPE CALIBRATION SYSTEM

TECHNOLOGICAL FIELD

Example embodiments of the present invention relate generally to telescope systems, and more particularly to calibration systems and methods for telescope systems.

BACKGROUND

Telescope systems are used in a variety of industries, including the space industry, to detect, track, and/or otherwise analyze celestial objects such as stars, planets, satellites, and/or the like. One such application includes laser ranging techniques for determining the distance between a celestial object and a telescope system. To do so, a telescope system can direct a laser to a targeted celestial object (e.g., satellite). As a result of the laser, a signal can be reflected from the targeted celestial object, which is received by the telescope system. The distance between the telescope system and the celestial object can be computed based on the transit time (e.g., at the speed of light) between the transmission of the laser and the reception of the signal responsive to the laser. This distance calculation can be used to detect the presence and/or the location of the targeted celestial object, track the targeted celestial object, and/or otherwise analyze the targeted celestial object.

The accuracy of a distance calculation and any other calculation made by a telescope system can be based on an understanding of the center of the telescope system. The center of a telescope system may not be computed or understood by conventional telescope systems. Instead, conventional telescope systems use space mount modeling techniques to calibrate telescope systems that may not be precisely aligned (e.g., rotation axes do not intersect, are not precisely orthogonal, etc.). These calibration techniques lack precision and may not be suitable for applications in which precise distance measurements may be advantageous such as, for example, for projects, including the space geodesy satellite laser ranging mission, that may benefit from well-defined telescope invariant points to precisely measure station to satellite distances.

An understanding of the location of the center of a telescope system including a telescope assembly mounted to a gimbal assembly can enable precise distance measurements and improve the determination of accurate celestial object measurements (e.g., locations, distances, movement, etc.). Systems and methods for co-aligning axes of a telescope and gimbal assembly and/or calculating the location of the center of a telescope system with a high degree of certainty would beneficially improve the accuracy and precision of telescope systems for several practical applications.

Through applied effort, ingenuity, and innovation, many of these identified problems have been solved by developing solutions that are included in embodiments of the present disclosure, many examples of which are described in detail herein.

BRIEF SUMMARY

Various embodiments described herein relate to systems, apparatuses, products, and methods for calibrating telescope systems, including a telescope and gimbal solution for establishing a telescope system invariant point representative of one center point for a telescope and gimbal assembly in a telescope system.

In accordance with one embodiment of the present disclosure, a telescope system is provided. The telescope system includes a gimbal assembly, a telescope assembly mounted to the gimbal assembly, and a payload platform. The payload platform includes a plurality of mechanical adjusters operable to establish a system invariant point for the telescope system by aligning (i) a gimbal invariant point of the gimbal assembly with (ii) a telescope invariant point of the telescope assembly.

In accordance with one embodiment of the present disclosure, a method for establishing a system invariant point for a telescope system including a telescope assembly mounted to a gimbal assembly is provided. The method includes positioning a telescope alignment sight over an alignment mechanism in the gimbal assembly. The telescope alignment sight includes an alignment target with one or more markings defining an axis of the telescope assembly. The method includes initiating, using an alignment telescope, light through the telescope alignment sight and the alignment mechanism in the gimbal assembly. And, the method includes adjusting a mounting position of the telescope assembly relative to the gimbal assembly based on a comparison between the alignment target and a feature marking disposed within the telescope assembly.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
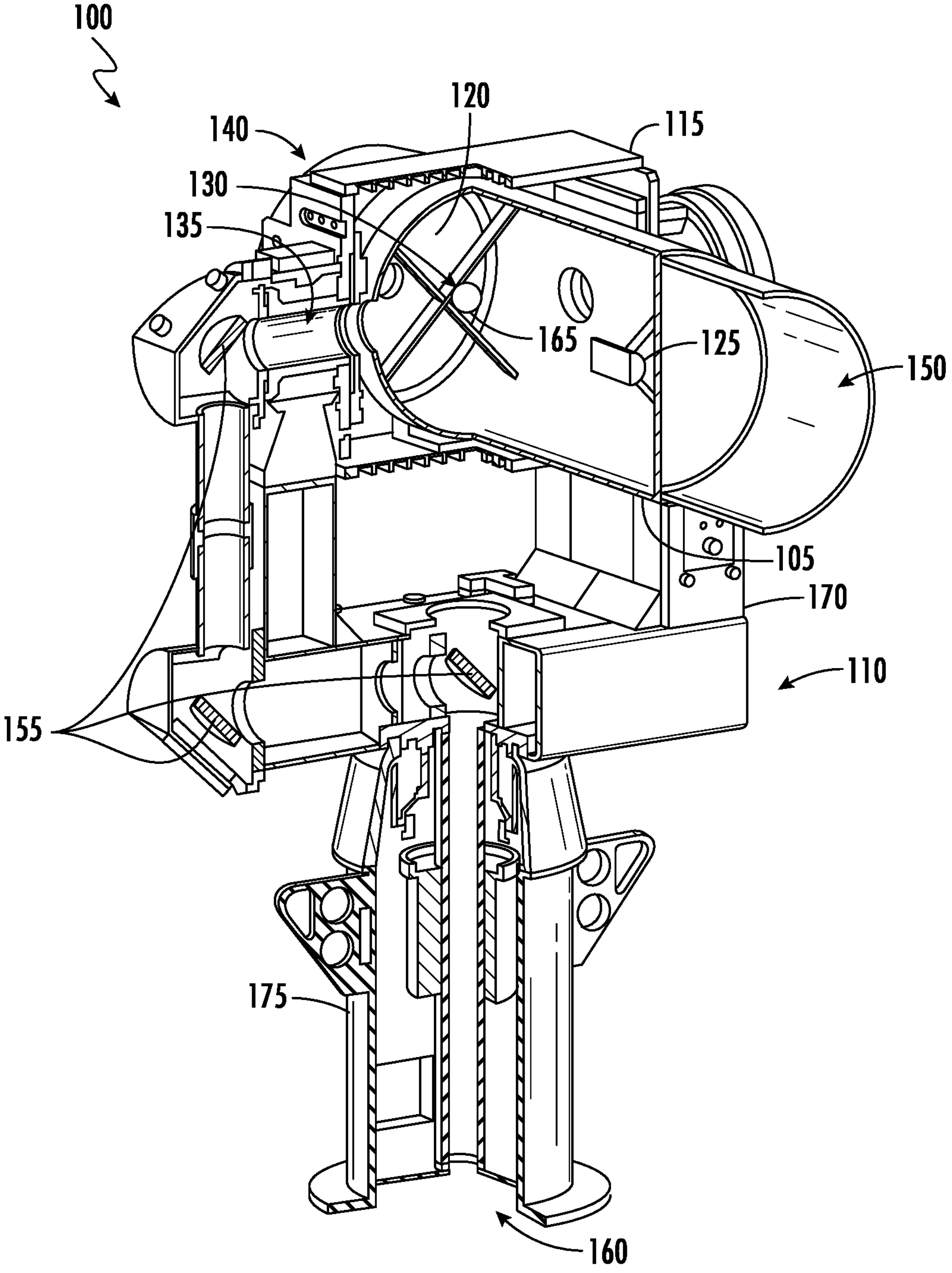
Figure 2A:
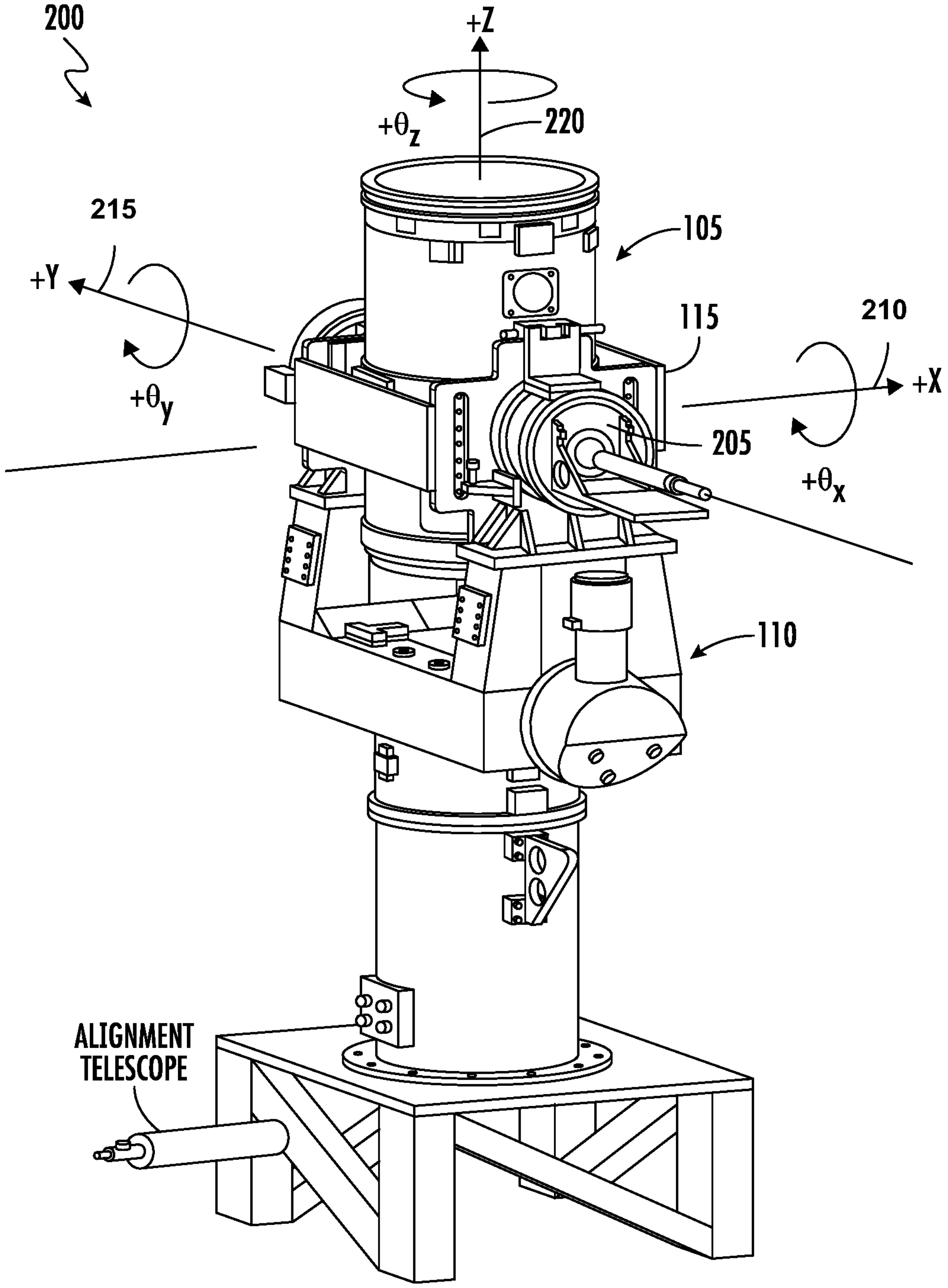
Figure 2B:
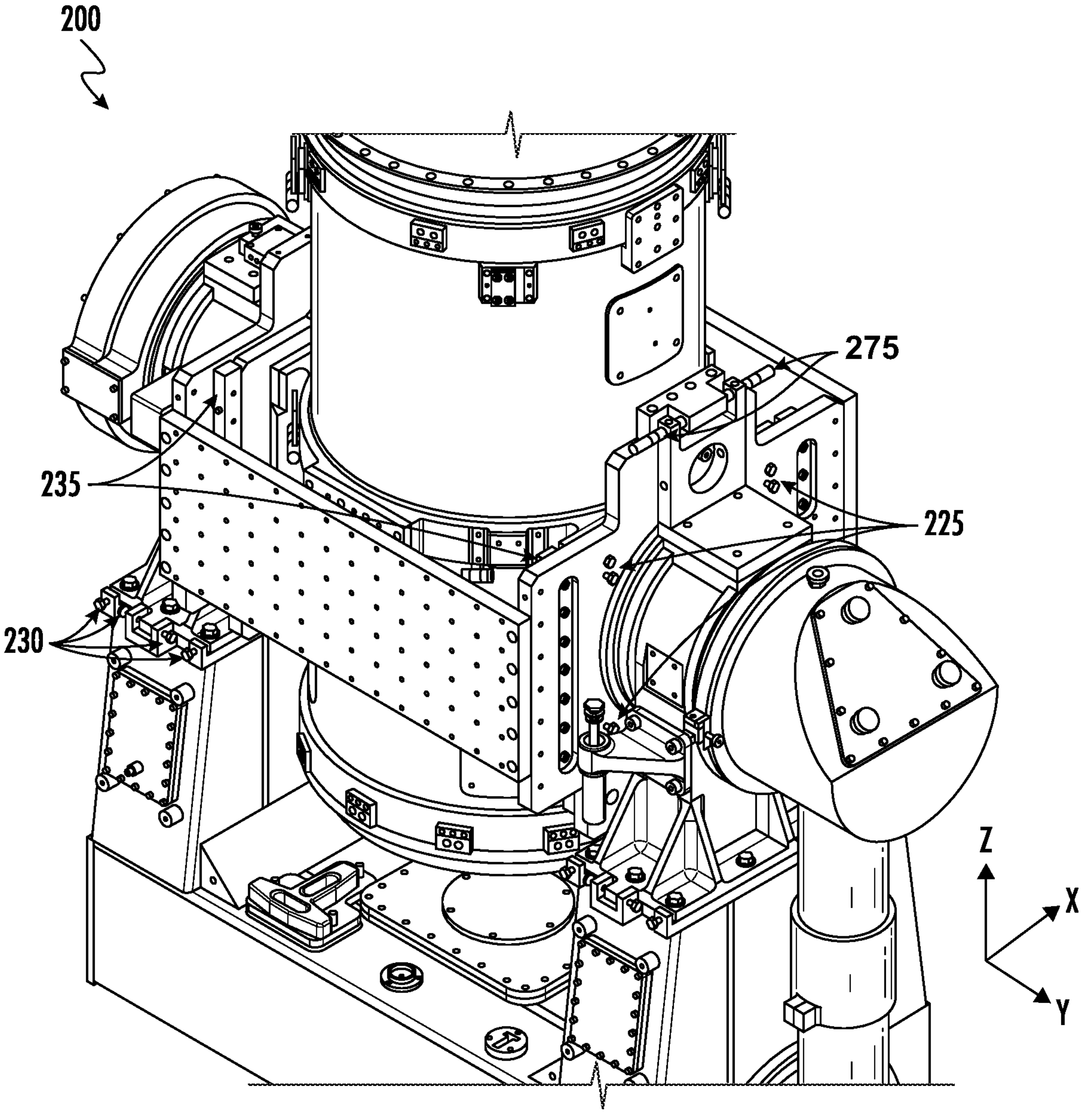
Figure 2C:
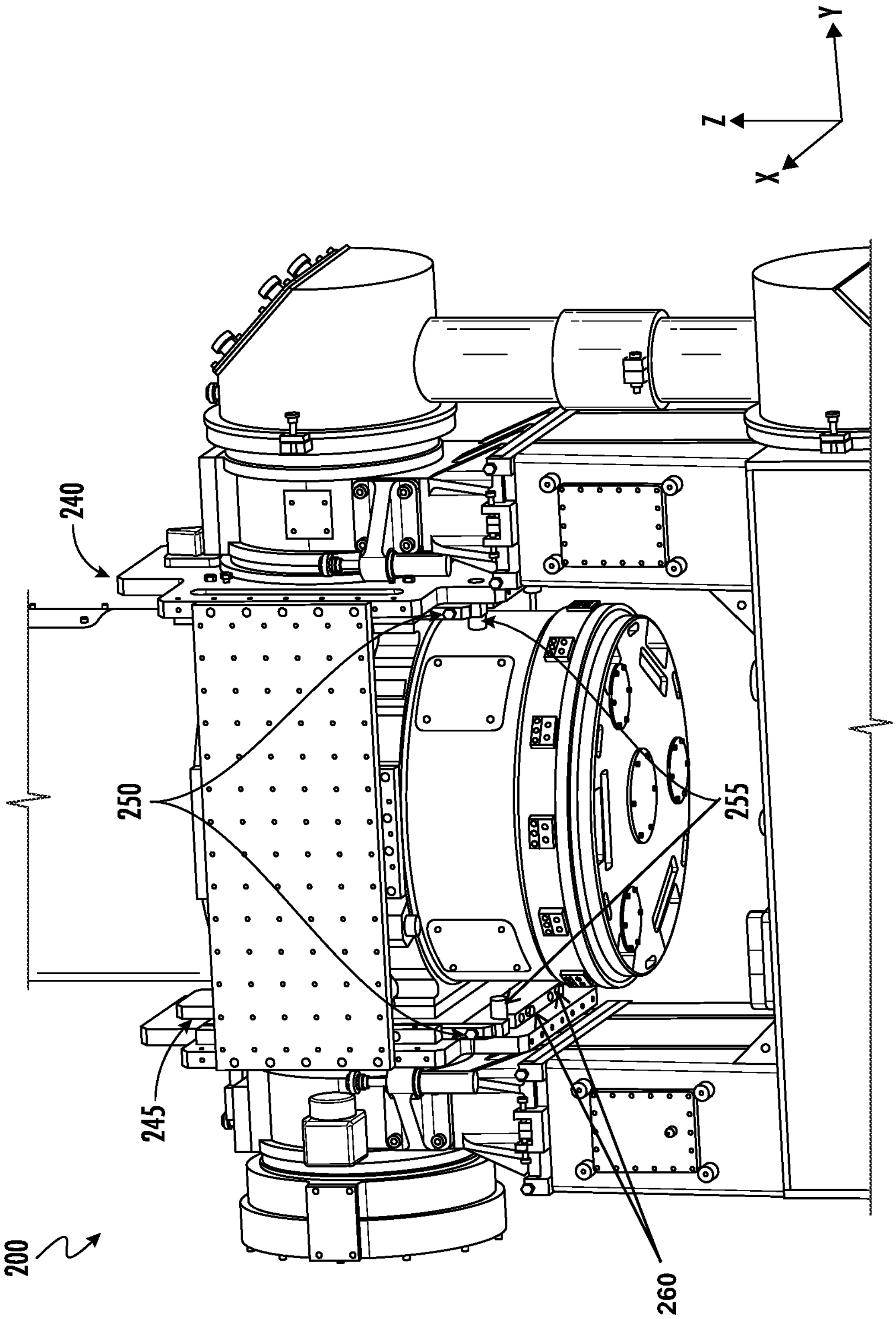
Figure 3:
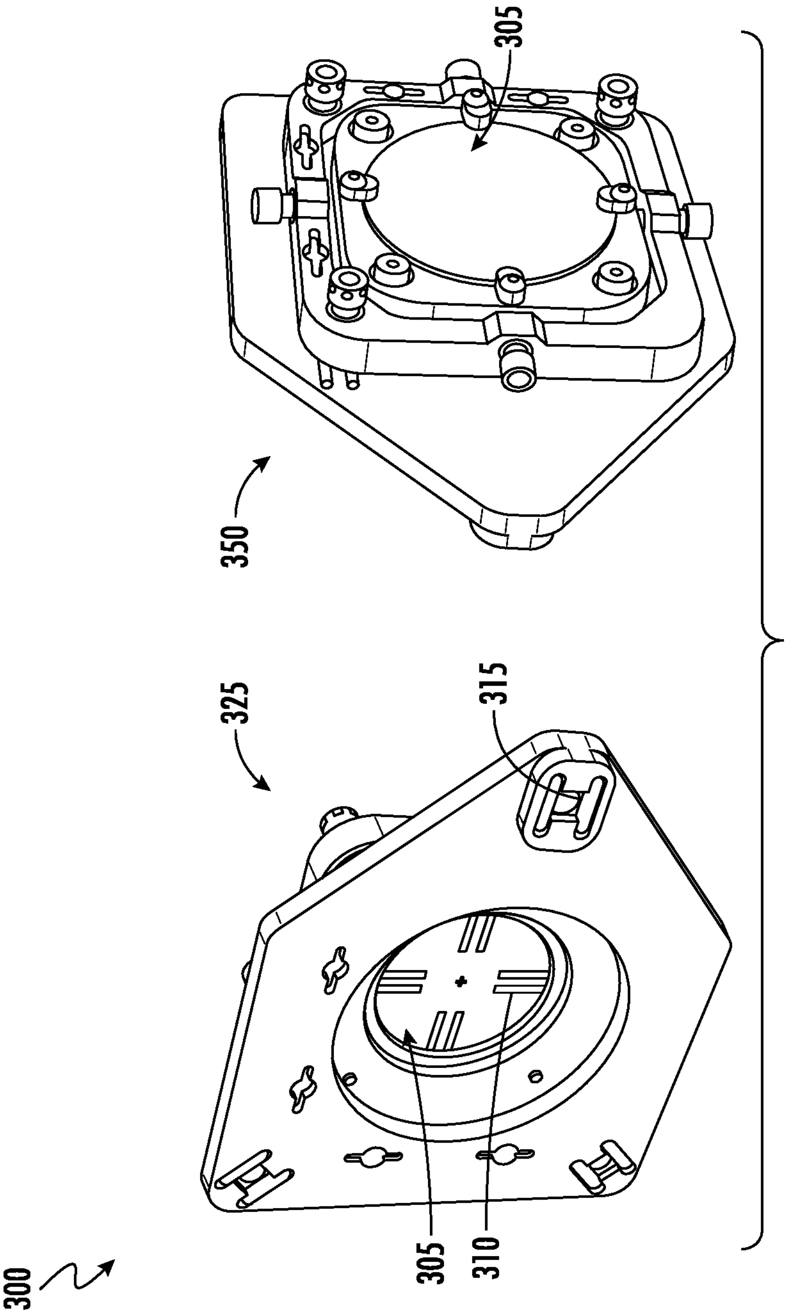
Figure 4:
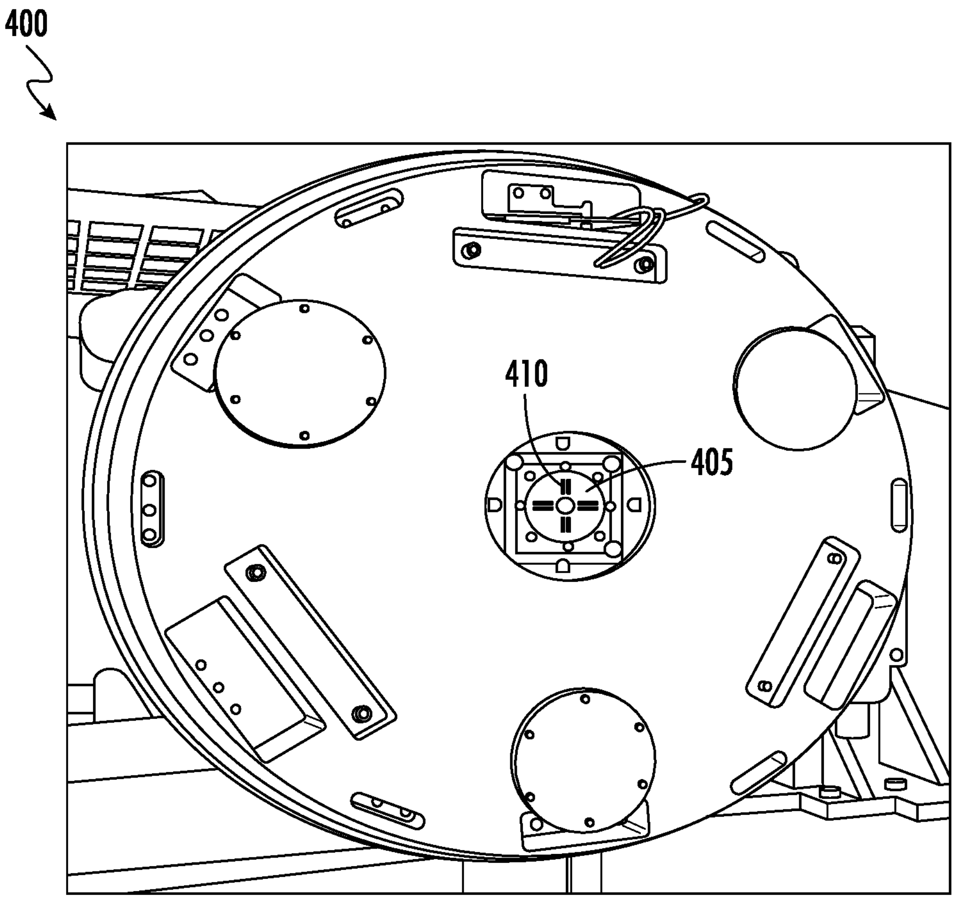
Figure 5:
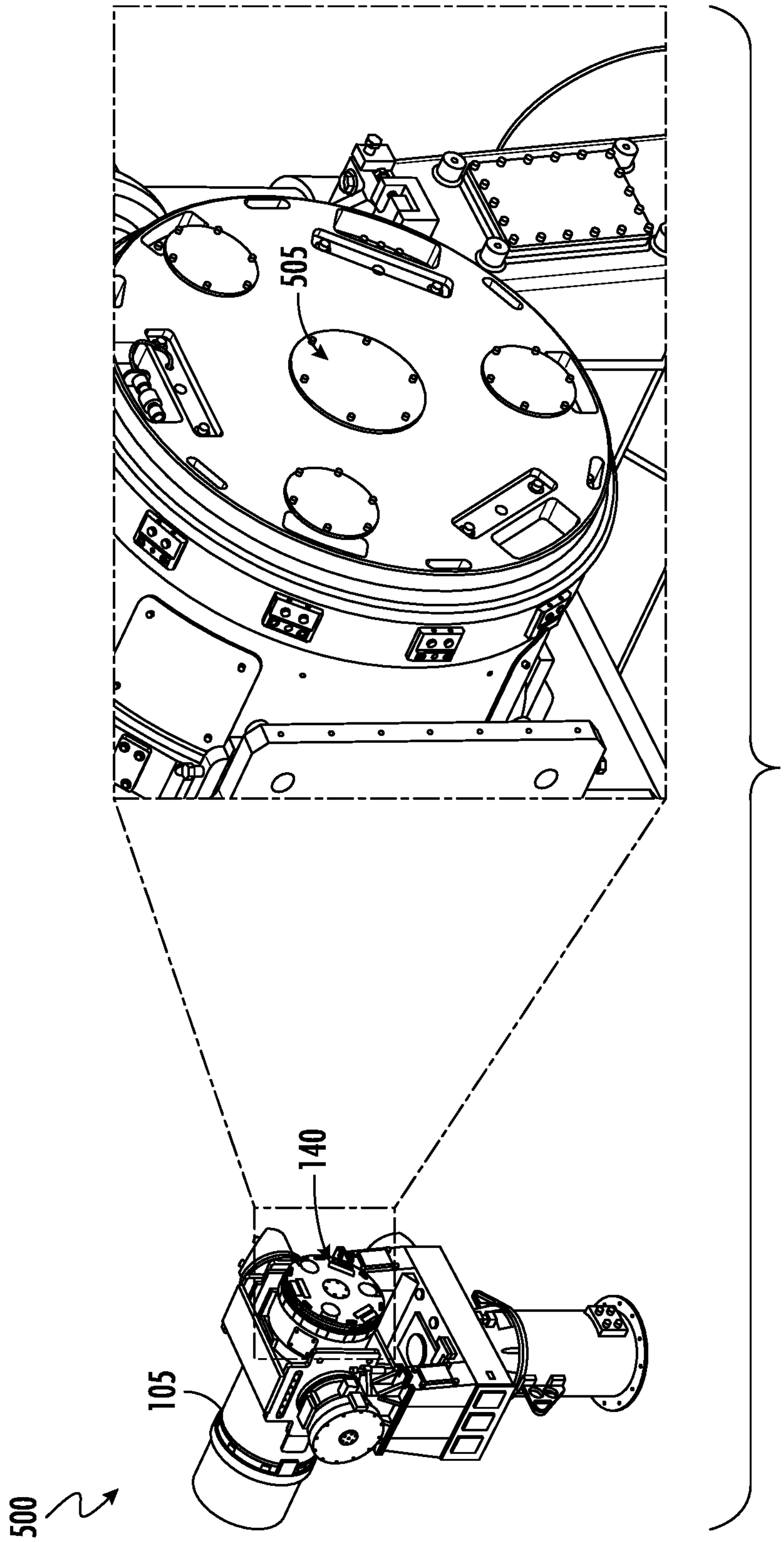
Figure 6:
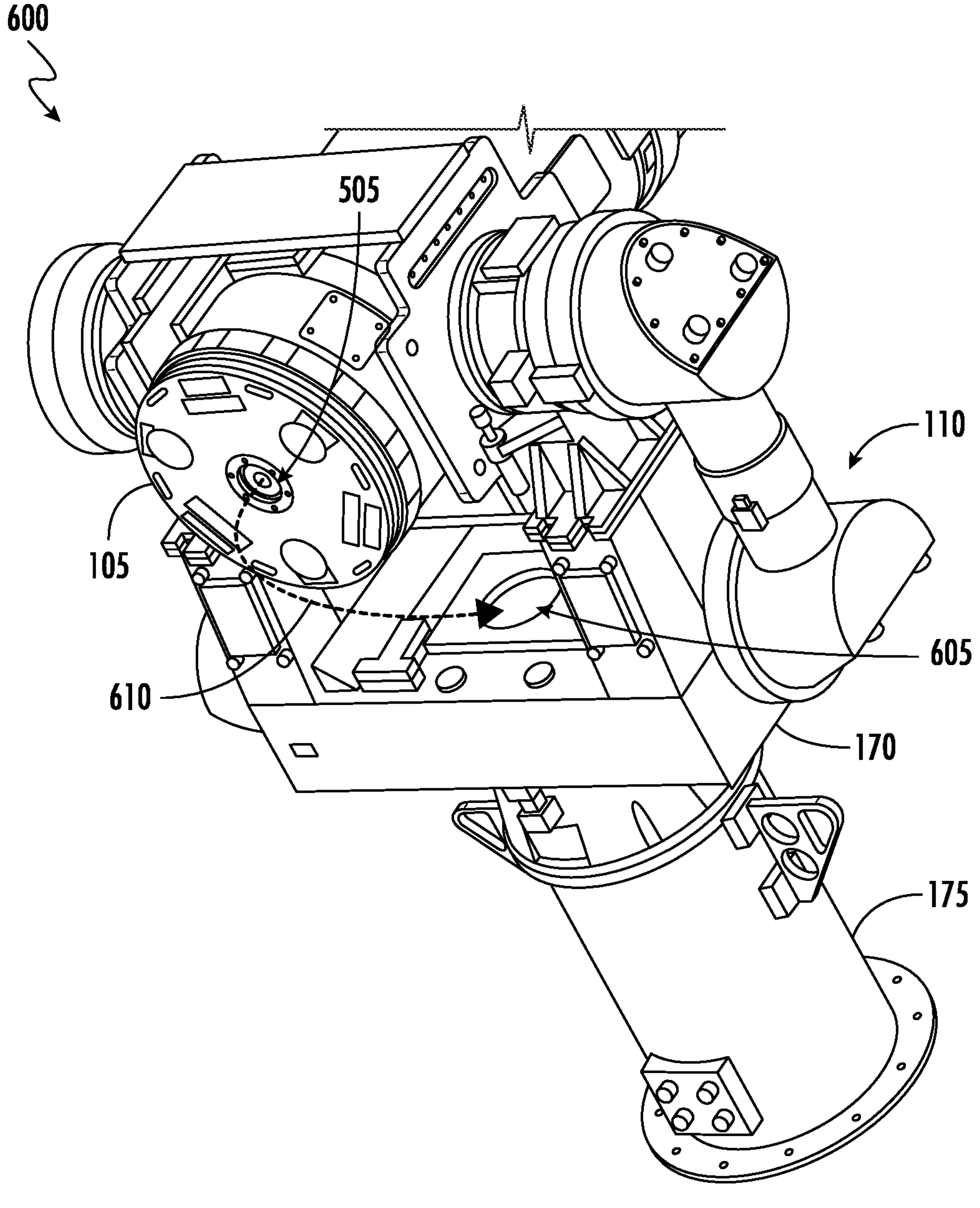
Figure 7:
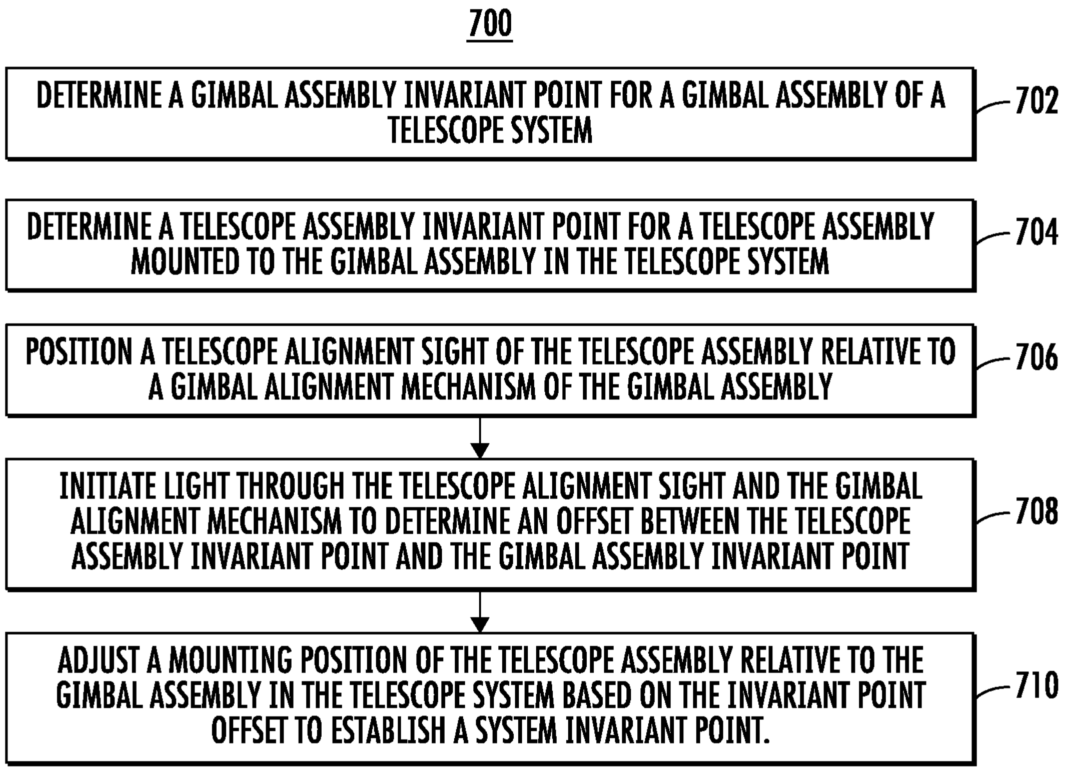
Figure 8:
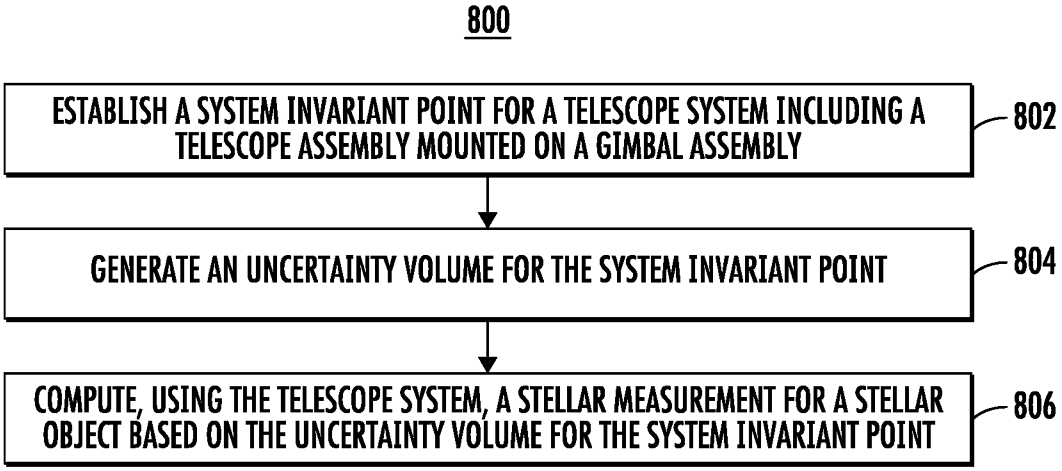

Having thus described certain example embodiments of the present disclosure in general terms, reference will now be made to the accompanying drawings, which are not necessarily drawn to scale, and wherein:

FIG. 1 illustrates an example telescope system in accordance with one or more embodiments of the present disclosure;

FIG. 2A illustrates an example telescope system with a plurality of mechanical adjusters in accordance with one or more embodiments of the present disclosure;

FIG. 2B illustrates a plurality of mechanical adjusters in accordance with one or more embodiments of the present disclosure;

FIG. 2C illustrates a plurality of mechanical adjusters in accordance with one or more embodiments of the present disclosure;

FIGS. 3-4 illustrate example alignment targets in accordance with one or more embodiments of the present disclosure;

FIG. 5 depicts an example placement of an alignment target in accordance with one or more embodiments of the present disclosure;

FIG. 6 illustrates an alignment configuration for the telescope system in accordance with one or more embodiments of the present disclosure;

FIG. 7 illustrates a flowchart according to an example method for calibrating a telescope system in accordance with one or more embodiments of the present disclosure;

FIG. 8 illustrates a flowchart according to an example method for tracking a celestial object in accordance with one or more embodiments of the present disclosure.

DETAILED DESCRIPTION

Embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved systems, apparatuses, products, and methods for calibrating telescope systems.

To overcome deficiencies with conventional telescope systems, the present disclosure provides a new telescope system design capable of co-aligning the axes of a gimbal assembly and a telescope assembly mounted to the gimbal assembly. The telescope system design includes a payload platform for mounting the telescope assembly to the gimbal assembly. The payload platform includes a plurality of mechanical adjusters such as, for example, a combination of push/push and/or push/pull mechanisms that are operable to adjust the mounting position of the telescope assembly relative to the gimbal assembly. In this manner, the telescope system design described herein enables the precise alignment of gimbal axes for intersection and orthogonality. In addition, an input and optical axis for a telescope assembly can be defined. As described herein, the plurality of mechanical adjusters can be utilized to align the axes of the gimbal assembly and the telescope assembly to establish a system invariant point.

The systems and methods of the present disclosure improve precision of telescope measurements by deterministically establishing a system invariant point that accounts for a gimbal invariant point of a gimbal assembly and a telescope invariant point of a telescope assembly mounted to the gimbal assembly. The system invariant point can be indicative of a theoretical center of the telescope system and can be used to improve celestial measurements (e.g., location, distance, movement, etc.) between a celestial object and the center of the telescope system. A plurality of mechanical adjusters can provide six degree-of-freedom control of the mounting position of the telescope assembly with respect to the gimbal assembly. These adjusters, in combination with a plurality of input/optical alignment targets, can be used to align the telescope invariant point with the gimbal invariant point to establish a true center point for the telescope system.

At times, a system invariant point can deviate due to one or more mechanical and/or environmental factors. To account for the uncertainty of the true center point of the telescope system, the present disclosure describes an uncertainty volume. The uncertainty volume can include a three-dimensional volume imposed around the system invariant point based on historical and simulation data indicative of past and/or simulated deviations to the system invariant point. The uncertainty volume can be used to further increase the reliability of measurements using the telescope system.

The present disclosure provides novel telescope systems and novel telescope calibration techniques that provide practical improvements in the technical field of space geodesy among other applications. For instance, a new data structure, the system invariant point, is provided that can be utilized to increase the accuracy of telescope measurements in a number of different applications. For example, by enabling the establishment and calculation of a system invariant point, the present disclosure improves laser range capabilities to satellites in orbit about the earth. By co-aligning the invariant points of a gimbal assembly and a telescope assembly to establish the system invariant point, the novel telescope system and calibration techniques described herein can provide for submillimeter accuracy and ranging for satellite detection and tracking.

It should be readily appreciated that the embodiments of the systems, apparatus, and methods described herein may be configured in various additional and alternative manners in addition to those expressly described herein.

Telescope System

FIG. 1 illustrates an example telescope system 100 in accordance with one or more embodiments of the present disclosure. The telescope system 100 can include a telescope assembly 105, a gimbal assembly 110, and a payload platform 115.

The telescope assembly 105 can include an optical tube assembly. The optical tube assembly can include a housing that defines a frontend 150 and a backend 140 of the telescope assembly 105. The telescope assembly 105 can include a plurality of mirror assemblies disposed within the housing. The plurality of mirror assemblies can include a primary mirror assembly 120 disposed proximate to the backend 140 of the telescope assembly 105, a secondary mirror assembly 125 disposed proximate to the frontend 150 of the telescope assembly 105, and a tertiary mirror assembly 130 disposed between the primary mirror assembly 120 and the secondary mirror assembly 125.

Each of the plurality of mirror assemblies can include one or more reflective surfaces for reflecting light that enters the housing of the telescope assembly 105. The reflective surfaces, for example, can include curved surfaces for reflecting light at one or more angles. In this manner, light that enters the housing of the telescope assembly 105 can be reflected from the primary mirror assembly 120 to the secondary mirror assembly 125 and/or from the secondary mirror assembly 125 to the tertiary mirror assembly 130. The tertiary mirror assembly 130 can reflect the light at an angle to exit the housing of the telescope assembly 105 through the coude path 135. By way of example, the light can be reflected from the tertiary mirror assembly 130 at a forty-five-degree angle to exit the housing of the telescope assembly 105 through a coude path 135 within the gimbal assembly 110.

The gimbal assembly 110 can include a plurality of gimbal mirrors 155 that define a coude path 135 from the housing of the telescope assembly 105 to an end point 160. An end point 160, for example, can include a pitted assembly to an optic bench. The gimbal assembly 110 can include a yoke assembly 170 and an azimuth assembly 175. The azimuth assembly 175 can include a vertical base platform (e.g., a riser). The yoke assembly 170 can include one or more arms (e.g., two arms, etc.) supported by the azimuth assembly 175. A payload platform 115 can couple the telescope assembly 105 to the yoke assembly 170.

The payload platform 115 includes a plurality of mechanical adjusters for adjustably mounting the telescope assembly 105 to the gimbal assembly 110. For example, the telescope assembly 105 can be mounted to the gimbal assembly 110 at a mounting position. The telescope assembly 105 can be mounted at the mounting position by the plurality of mechanical adjusters of the payload platform 115. The plurality of mechanical adjusters can provide six degree-of-freedom control of the mounting position of the telescope assembly 105 with respect to the gimbal assembly 110. Using the mechanical adjusters, the telescope assembly 105 can be repositioned in six degrees of freedom to precisely align the telescope assembly 105 with the gimbal assembly 110.

The plurality of mechanical adjusters, for example, can be utilized to align one or more axes of the telescope assembly 105 with one or more axes of the gimbal assembly 110. For instance, the axes can be aligned to co-align a telescope invariant point of the telescope assembly 105 with a gimbal invariant point of the gimbal assembly 110 to establish a system invariant point 165. The telescope invariant point of the telescope assembly 105, for example, can describe the center point of the telescope assembly 105 that remains unchanged when the telescope assembly 105 is transformed from one position to another. The gimbal invariant point of the gimbal assembly 110 can describe the center point of the gimbal assembly 110 that remains unchanged when the gimbal assembly 110 is transformed from one position to another.

The system invariant point 165 can represent a theoretical center point of the telescope system 100. The system invariant point 165 can include a three-dimensional point relative to (e.g., within) the telescope assembly 105. The system invariant point 165 can be defined by an intersection between a telescope invariant point and a gimbal invariant point such that it accounts for the center of each of the telescope assembly 105 and the gimbal assembly 110. For example, the telescope invariant point can be defined by an intersection between an input axis and an optical axis of the telescope assembly 105, the gimbal invariant point can be defined by an intersection between an elevation axis and an azimuthal axis of the gimbal assembly 110. The system invariant point 165 can be established to co-aligning (i) the intersection between the input axis and the optical axis of the telescope assembly 105 with (ii) the intersection between the elevation axis and the azimuthal axis of the gimbal assembly 110. Once aligned, the system invariant point 165 can be at least partially fixed in space and remain fixed as the telescope assembly 105 is rotated in any direction in three-dimensional space.

In some embodiments, the system invariant point 165 of the telescope system 100 can remain fixed within a threshold area. For example, deviations to the telescope system 100 can cause the true center of the telescope system 100 to deviate from the system invariant point 165. This can occur, for example, due to one or more mechanical factors such as bearing wobble, environmental factors such as temperature/humidity, and/or other factors that can cause the telescope system 100 to move within three degrees of freedom.

To account for potential deviations to the system invariant point 165, an uncertainty volume associated with the system invariant point 165 can be determined for the system invariant point 165. The uncertainty volume includes a three-dimensional volume relative to (e.g., within) the telescope assembly 105. The three-dimensional volume can be defined by a three-dimensional shape such as a sphere, hemisphere, etc. indicative of one or more potential deviations to the system invariant point 165. For example, the three-dimensional volume can be representative of a potential invariant point offset due to mechanical and/or environmental factors.

The potential invariant point offset can be determined based on historical and/or simulation data indicative of a past and/or simulated deviations to a true center point of a calibrated telescope system. For example, simulations can be performed based on historical data to map repeatable impacts to the center point of a telescope system due to mechanical and/or environmental factors. By way of example, bearing wobble can be mostly repeatable and the impacts of bearing wobble to a center point of a telescope system can be computed and applied to a system invariant point to determine a potential invariant point offset as a function of anticipated bearing wobble. As another example, impacts to a center point of a telescope system due to temperature changes can be observed, simulated, etc. and applied to a system invariant point to determine a potential invariant point offset as a function of anticipated temperature.

To account for invariant point uncertainty for the telescope system 100 at any point time, the uncertainty volume can be projected around the system invariant point 165. In this manner, the system invariant point 165 can be associated with a three-dimensional volume relative to the telescope assembly 105. The three-dimensional volume can be defined by a three-dimensional shape indicative of one or more potential changes (e.g., an uncertainty) of the system invariant point 165. The three-dimensional volume can be based on offset factors such as bearing wobble, temperature, etc. For example, the three-dimensional volume can be defined based on repeatable errors observed due to bearing wobble, temperature induced errors, etc. The three-dimensional volume can include be a one-millimeter or less sphere of uncertainty projected around the three-dimensional system invariant point 165 of the telescope system 100.

FIG. 2A illustrates an example telescope system 200 with a plurality of mechanical adjusters 205 in accordance with one or more embodiments of the present disclosure. The telescope system 200 includes a gimbal design which allows the gimbal axes to be precisely aligned for intersection and orthogonality, and is equipped with interface controls (e.g., mechanical adjusters 205) to adjust a telescope assembly 105 in a six degree of freedom manner (x-y-z tilt and x-y-z translation) with respect to the gimbal assembly 110.

The gimbal assembly 110 can include a payload platform 115. The payload platform 115 can include a plurality of mechanical adjusters 205 operable to align a gimbal invariant point of the gimbal assembly 110 and a telescope invariant point of the telescope assembly 105 to establish a system invariant point. The plurality of mechanical adjusters 205 can be operable to translate the telescope assembly 105 along three primary directions (e.g., x, y, z) and rotate the telescope assembly 105 along three rotational directions (e.g., $\theta_x$, $\theta_y$, $\theta_z$) to align the invariant points of the telescope assembly 105 and the gimbal assembly 110.

The plurality of mechanical adjusters 205 can include at least one push/pull or push/push mechanism. The push/pull or push/push mechanisms can include one or more types of fasteners, machine bolts, tubes, etc. For instance, the plurality of mechanical adjusters 205 can include a plurality of push/pull bolts, a plurality of push/push bolts, and/or combinations thereof. For example, the plurality of mechanical adjusters 205 can include one or more push/push and/or push/pull bolts located in each direction (e.g., x, y, z, $\theta_x$, $\theta_y$, $\theta_z$, etc.) of the telescope system 200 to control the translation and rotation of the telescope assembly 105 with respect to the gimbal assembly 110 in six degrees of freedom.

By way of example, the plurality of mechanical adjusters 205 can include one or more x-axis adjusters operable to translate the telescope assembly 105 along an x-axis 210 and/or rotate the telescope assembly 105 about the x-axis 210. In addition, or alternatively, the plurality of mechanical adjusters 205 can include one or more y-axis adjusters operable to translate the telescope along a y-axis 215 and/or rotate the telescope assembly 105 about the y-axis 215. In addition, or alternatively, the plurality of mechanical adjusters 205 can include one or more z-axis adjusters operable to translate the telescope along a z-axis 220 and/or rotate the telescope assembly 105 about the z-axis 220. In this manner, the gimbal design can have a gimbal-to-telescope interface design that allows the installed telescope assembly 105 to be repositioned in six degrees of freedom with respect to the gimbal assembly 110.

As one example, the telescope assembly 105 can be translated along the x-axis 210 by one or more first mechanical adjusters (e.g., four push/pull bolts, etc.). The telescope assembly 105 can be translated along the y-axis 215 by one or more second mechanical adjusters (e.g., eight push/pull bolts, etc.). The telescope assembly 105 can be translated along the z-axis 220 by one or more third mechanical adjusters (e.g., four push/pull bolts, etc.). The telescope assembly 105 can be tilted about the y-axis 215 (e.g., in a $\theta_y$ direction) using the elevation axis of the gimbal assembly 110. The telescope assembly 105 can be tilted about the x-axis 210 (e.g., in a $\theta_x$ direction, respectively) using the third mechanical adjusters associated with z-axis 220. The telescope assembly 105 can be tilted about the z-axis 220 (e.g., in a 02 direction, respectively) using the first mechanical adjusters associated with x-axis 210.

The payload platform 115 can include one or more locking bars. The locking bars can correspond to the plurality of mechanical adjusters 205. For instance, the locking bars can be operable to lock the telescope assembly 105 into a particular mounting position. The locking bars, for example, can be configured to maintain a calibrated mounting position for the telescope assembly 105 relative to the gimbal assembly 110 once a system invariant point is established. The locking bars can be designed to prevent strain to the telescope assembly 105 to avoid deformation of the telescope system 100.

The plurality of mechanical adjusters 205 can allow the yoke arms (e.g., trunnions) of the gimbal assembly 110 to be co-axially aligned in the y-axis 215. In addition, the plurality of mechanical adjusters 205 can allow the z-axis 220 and the y-axis 215 to intersect and to be orthogonal. The yoke arm co-axiality and gimbal intersection/orthogonality can be first established using mechanical (e.g., rotation) techniques and then confirmed using optical techniques as described herein.

In this manner, the mechanical adjusters 205 can be operable to develop an input axis (e.g., an elevation axis) of the telescope assembly 105 and an optical axis of the telescope assembly 105. The input and optical axis of the telescope assembly 105 can be aligned with the elevation and azimuth axis of the gimbal assembly 110. For example, the intersection between the input and optical axis of the telescope assembly 105 can be overlayed with the intersection between the elevation and azimuth axis of the gimbal assembly 110 to define the system invariant point within the telescope system 100. The two intersection points, for example, can be overlayed to create a composite volume indicative of the center of the telescope system 100.

FIG. 2B illustrates a plurality of mechanical adjusters 205 in accordance with one or more embodiments of the present disclosure. The mechanical adjusters 205 can include a plurality of y-axis adjusters 275 that include micrometer push-pull adjusters for re-centering elevation Y axis during the optical telescope assembly invariant point integrations. In some examples, the mechanical adjusters 205 can include a plurality of drive plate adjusters 225. The drive plate adjusters 225 can include a push-pull bolt set that include four sets per drive plate, two upper and two lower that control translation in the y-axis and tilt in the x-axis. In some examples, the mechanical adjusters 205 can include a plurality of trunnion adjusters 230. The trunnion adjusters 230 can include push-push bolts for precise trunnion coaxial alignment. In some examples, the mechanical adjusters 205 can include a plurality of locking bars 235. The locking bars can include four bars for locking down the telescope assembly when the telescope assembly is adjusted in final position. The locking bars can include cylindrical mating surfaces to prevent assembly strain.

FIG. 2C illustrates a plurality of mechanical adjusters 205 in accordance with one or more embodiments of the present disclosure. The mechanical adjusters 205 can include a drive plate 240 and an adaptor plate 240 that is supported by one or more v-blocks. In some examples, the mechanical adjusters 205 can include a plurality of adaptor plate adjusters 250. The adaptor plate adjusters 250 can include two adjusters for translation in the x-axis and tilt in the z-axis. In some examples, the mechanical adjusters 205 can include a plurality of v-blocks 255 supported by one or more drive plate dowel pins. In some examples, the mechanical adjusters 205 can include a plurality of v-blocks adjusters 260 that can include two push-pull bolts for translation in the z-axis and tilt in the x-axis.

Optical alignment targets can be utilized to locate the system invariant point within the telescope system 200 at any given time such as, during calibration of the telescope system.

Alignment Targets

A telescope assembly can include a plurality of alignment targets operable to establish a system invariant point for a telescope system including a telescope assembly mounted to a gimbal assembly. The alignment targets can be removably and/or statically positioned at one or more positions of a telescope assembly. For instance, one or more of the alignment targets can be removably positioned at one or more positions of the telescope assembly during an initial alignment of the telescope assembly with a gimbal assembly to establish a system invariant point.

The alignment targets can include a reticle mirror. The reticle mirror can include a plurality of markings indicative of an axis of the telescope assembly. For instance, the reticle mirror can include a plurality of hash marks associated with an axis of the telescope assembly. For example, the alignment targets can include (i) at least one first reticle mirror (e.g., optical telescope assembly input reference) positioned relative to an input axis (e.g., an elevation axis) of the telescope assembly and (ii) at least one second reticle mirror (e.g., optical telescope assembly alignment reference) positioned relative to an optical axis of the telescope assembly. In some examples, the at least one second reticle mirror can be removably positioned at one or more positions of the telescope assembly during an initial alignment of the telescope assembly with a gimbal assembly to establish a system invariant point. In some examples, the at least one first reticle mirror can be statically positioned at one or more positions of the telescope assembly.

As described herein, the telescope assembly can include a primary mirror assembly disposed proximate to a backend of the telescope assembly, a secondary mirror assembly disposed proximate to the frontend of the telescope assembly, and/or a tertiary mirror assembly disposed between the primary mirror assembly and the secondary mirror assembly. In some embodiments, the tertiary mirror assembly can include a feature marking indicative of the telescope invariant point. The feature marking can include a fiduciary mark placed in the center of the tertiary mirror.

The alignment targets can be utilized with the feature marking to align the gimbal invariant point of the gimbal assembly and the telescope invariant point of the telescope assembly to establish a system invariant point. For example, the hash marks of the first reticle mirror can be utilized to align the telescope assembly and the gimbal assembly along an input axis of the telescope assembly by repositioning the telescope assembly (e.g., using the plurality of adjustment mechanisms described herein) to match the feature marking with the markings of the first reticle mirror. The hash marks of the second reticle mirror can be utilized to align the telescope assembly and the gimbal assembly along the optical axis of the telescope assembly by repositioning the telescope assembly (e.g., using the plurality of adjustment mechanisms described herein) to match the feature marking with the markings of the second reticle mirror.

The alignment targets can be positioned relative to one or more mechanical axes associated with the gimbal assembly to establish an initial system invariant point for the telescope system. By way of example, the one or more mechanical axes can include at least one of an elevation axis and/or an azimuthal axis of the gimbal assembly. The position of the telescope assembly can be modified such that the plurality of alignment targets identify an overlap between an input axis of the telescope assembly and the elevation axis of the gimbal assembly and/or an overlap between the optical axis of the telescope assembly and the azimuthal axis of the gimbal assembly such that the feature marking is centered within the hash marks of the alignment targets.

FIGS. 3 and 4 illustrate example alignment targets in accordance with one or more embodiments of the present disclosure. The plurality of alignment targets can include one or more input axis alignment targets and one or more optical axis alignment targets.

FIG. 3 illustrates a front view 325 of an example input axis alignment target 300 and a back view 350 of the example input axis alignment target 300. The input axis alignment targets 300 can be established during the assembly and test of the telescope system. Each input axis alignment target 300 includes a reticle mirror 305. The reticle mirror 305 includes a plurality of markings 310. The plurality of markings 310 include a plurality of hash marks and a center mark. The plurality of markings 310 can be utilized to align a gimbal assembly and a telescope assembly along an input and elevation axis as described herein. The input axis alignment targets 300 can be kinematically installed inside the telescope assembly. As an example, the input axis alignment targets 300 can be kinematically installed within an input port of the telescope assembly.

For example, the input axis alignment targets 300 can be positioned on truncated balls within the housing of the telescope. The input axis alignment targets 300 can include three sets of grooves 315 that can be magnetically seated on the truncated balls within the housing of the telescope assembly. In this manner, each input axis alignment target can be kinematically returned to its exact placement position. For example, the input axis alignment targets 300 can include one or more mechanical adjusters (e.g., push-pull bolts, etc.) for translation and tilt. During calibration, the alignment targets 300 may be moved, using the mechanical adjusters, to block a beam path of the telescope assembly. An exact placement position may be determined while calibrating the telescope assembly. After calibration, the input axis alignment targets 300 may be removed to clear the obstruction from the beam path. The truncated balls, however, may remain, which allows the input axis alignment targets to be returned to the exact placement position during subsequent calibration exercises.

FIG. 4 illustrates an example optical axis alignment target 400. The optical axis alignment target 400 can also be established during the assembly and test of the telescope system. The optical axis alignment target 400 includes a reticle mirror 405 with a plurality of markings 410. The plurality of markings 410 include a plurality of hash marks and a center mark. The plurality of markings 410 can be utilized to align the gimbal assembly and the telescope assembly along the optical and azimuthal axis as described herein.

In some embodiments, the optical axis alignment targets can be permanently attached to the rear of the telescope assembly. For example, FIG. 5 depicts an example placement 500 of an optical axis alignment target 400 in accordance with one or more embodiments of the present disclosure. The optical axis alignment target 400 can be positioned at an optical boresight 505 located at the backend 140 of the telescope assembly 105. The optical axis alignment target 400 can be positioned within the optical boresight 505 behind a target cover on the exterior surface of the telescope assembly 105.

FIG. 6 illustrates an alignment configuration 600 for the telescope system in accordance with one or more embodiments of the present disclosure. The alignment configuration 600 provides an example for aligning the optical axis of the telescope assembly 105 with the azimuthal axis of the gimbal assembly 110. To do so, telescope assembly 105 can be repositioned (as shown by arrow 610) to align the optical boresight 505 with a central hole 605 in the yoke assembly 170 of the gimbal assembly 110. Once aligned, an azimuth alignment telescope can provide light through the coude path in the azimuth assembly 175 to the telescope assembly 105 through the optical boresight 505 and central hole 605. A feature marking on the tertiary mirror of the telescope assembly 105 and a plurality of markings of the optical axis alignment target 400 within the optical boresight 505 can be utilized to align the optical axis of the telescope assembly 105 with the azimuthal axis of the gimbal assembly 110.

This process can be repeated to align the input and elevation axes of the telescope assembly 105 and the gimbal assembly 110 to establish a system invariant point.

Example Operations

FIG. 7 illustrates a flowchart according to an example method 700 for calibrating a telescope system in accordance with one or more embodiments of the present disclosure. The telescope system, for example, can be calibrated by establishing a system invariant point representative of an overlapping invariant point for a gimbal assembly and a telescope assembly mounted thereto. The system invariant point can be established by aligning the axes (e.g., input, elevation, optical, azimuth, etc.) of the gimbal assembly with the telescope assembly using a plurality of telescope alignment targets as described herein.

The example method 700 includes mating the telescope assembly to the gimbal assembly to establish a shared system invariant point that is precisely positioned in three-dimensional space. This involves making slight adjustments to the mounting position of the telescope assembly relative to the gimbal assembly to co-align a telescope invariant point (e.g., an optical invariant point) of the telescope assembly with a gimbal invariant point (e.g., a mechanical invariant point) of the gimbal assembly. In some examples, the step/operations of the method 700 can be performed to adjust a position of a telescope assembly and/or gimbal assembly by interfacing with one or more mechanical adjusters of the telescope system.

At step/operation 702, the method 700 can include determining a gimbal invariant point for a gimbal assembly. A plurality of alignment telescopes can be utilized to determine the gimbal invariant point with a high degree of precision (e.g., within arcseconds and thousands of an inch). A first alignment telescope can be aligned within the azimuth axis of the gimbal assembly. A second alignment telescope can be aligned within the elevation axis of the gimbal assembly. The alignment of the first and second alignment telescopes can be proved with a precision optical cube. The intersection of the elevation axis and the azimuth axis can be utilized to determine the gimbal invariant point for the gimbal assembly.

At step/operation 704, the method 700 can include determining a telescope invariant point for a telescope assembly. A plurality of alignment telescopes can be utilized to determine the telescope invariant point with a high degree of precision (e.g., within arcseconds and thousands of an inch). A first alignment telescope can be aligned within the optical axis of the telescope assembly. A second alignment telescope can be aligned within the input (e.g., elevation) axis of the telescope assembly. The alignment of the first and second alignment telescopes can be proved with a precision optical cube. The intersection of the input axis and the optical axis can be utilized to determine the telescope invariant point for the telescope assembly.

In some embodiments, the telescope invariant point can be identified by a feature marking within the housing of the telescope assembly. The feature marking, for example, can include a fiduciary mark placed on the center of a tertiary mirror within the telescope assembly. The fiduciary mark can identify the telescope invariant point for the telescope assembly.

At step/operation 706, the method 700 can include positioning a telescope alignment sight relative to a gimbal alignment mechanism. The telescope alignment sight may include any means (e.g, a window, gap, hole, etc.) within the housing of the telescope assembly that allows light to enter the telescope assembly. The gimbal alignment mechanism includes a window, gap, hole, etc. within the gimbal assembly that allows light to exit the gimbal assembly. For example, the gimbal alignment mechanism can include an alignment hole (e.g., a center hole, etc.) within the gimbal assembly.

The telescope alignment sight can include an alignment target with one or more markings defining an axis of the telescope assembly. The one or more markings can be utilized, with the feature marking disposed within the telescope assembly, to align the telescope assembly along the axis.

The first telescope alignment sight can be positioned over a first alignment mechanism of the gimbal assembly to calibrate the telescope system with respect to a respective axis of the telescope and gimbal assemblies. A second telescope alignment sight can be positioned over a second alignment mechanism of the gimbal assembly to calibrate the telescope system with respect to another axis of the telescope and gimbal assemblies. This process can be repeated for each axis of the telescope and gimbal assemblies to establish the system invariant point.

At step/operation 708, the method 700 can include initiating light through the telescope alignment sight. For example, the light may be initiated through the telescope alignment sight to determine an offset between a telescope assembly invariant point and a gimbal assembly invariant point. By way of example, an alignment telescope can initiate light through a coude path in the gimbal assembly into the telescope assembly via a respective telescope alignment sight. The one or more markings of the alignment target in the telescope alignment sight can be compared to the feature marking within the housing of the telescope assembly to determine the offset between the telescope assembly invariant point and the gimbal assembly invariant point.

At step/operation 710, the method 700 can include adjusting a mounting position of the telescope assembly relative to the gimbal assembly based on the invariant point offset to establish a system invariant point. The mounting position can be adjusted based on a comparison between the alignment target and a feature marking disposed within the telescope assembly. For example, the mounting position can be manipulated to move the telescope assembly to align the one or more markings of the alignment target with the feature marking to align the telescope assembly and the gimbal assembly along a respective axis. This process can be repeated for each axis to align the telescope invariant point with the gimbal invariant point to establish a system invariant point.

As described herein, the system invariant point can be subject to potential deviations due to mechanical and/or environmental factors such as temperature changes, bearing wobble, etc. To account for such changes, in some embodiments, a three-dimensional volume such as a sphere, hemisphere, etc. can be projected around the system invariant point.

FIG. 8 illustrates a flowchart according to an example method 800 for tracking a celestial object in accordance with one or more embodiments of the present disclosure. The celestial object, for example, can include a celestial body, a satellite, etc.

At step/operation 802, the method 800 can include establishing a system invariant point for a telescope system. In some embodiments, the step/operation 802 can include one or more steps/operations of method 700 in which a telescope system is calibrated to establish the system invariant point.

At step/operation 804, the method 800 can include generating an uncertainty volume for the system invariant point. The uncertainty volume can include a three-dimensional volume projected around the system invariant point to accommodate for uncertainty with the system invariant point at any given time. By way of example, the exact location of the system invariant point can dynamically change due to mechanical and/or environmental factors such as bearing wobble, temperature, etc. The uncertainty volume can be defined by a three-dimensional shape indicative of one or more potential deviations (e.g., an uncertainty) of the system invariant point. As described herein, the uncertainty volume can be determined based on observable errors over time. In some examples, the uncertainty volume can include a one-millimeter sphere of uncertainty projected around the system invariant point of the telescope system.

At step/operation 806, the method 800 can include computing a space measurement for a celestial object using the uncertainty volume for the system invariant point. By way of example, laser ranging can be performed using the telescope system to determine a distance from the center of the telescope system to a target celestial object such as a satellite. A location of the target celestial object can be determined based on a comparison between the computed distance and the uncertainty volume for the system invariant point. Unlike conventional space measurement techniques, the sphere of uncertainty described herein provides for an understanding of the actual center of the telescope system. This, in turn, allows for the accurate determination of space measurements such as, for example, locations of celestial objects with a high degree of certainty and without post processing techniques such as space mount modeling techniques.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

The invention claimed is:

1. A telescope system, comprising:
- a gimbal assembly;
- a telescope assembly mounted to the gimbal assembly; and
- a payload platform comprising a plurality of mechanical adjusters operable to establish a system invariant point for the telescope system by aligning (i) a gimbal invariant point of the gimbal assembly with (ii) a telescope invariant point of the telescope assembly, wherein the system invariant point is established by overlaying (a) an intersection between an input axis and an optical axis of the telescope assembly with (b) an intersection between an elevation axis and an azimuthal axis of the gimbal assembly.

2. The telescope system of claim 1, wherein the system invariant point comprises a three-dimensional point representative of a center point of the telescope assembly and the gimbal assembly.

3. The telescope system of claim 2, wherein the system invariant point is associated with an uncertainty volume comprising a three-dimensional volume relative to the telescope assembly.

4. The telescope system of claim 3, wherein the three-dimensional volume is defined by a three-dimensional shape indicative of one or more potential deviations to the system invariant point.

5. The telescope system of claim 1, wherein the gimbal assembly comprises a yoke assembly and an azimuth assembly.

6. The telescope system of claim 5, wherein the payload platform is operable to couple the telescope assembly to the yoke assembly, and wherein the plurality of mechanical adjusters is operable to reposition the telescope assembly in six degrees of freedom.

7. The telescope system of claim 1, wherein the plurality of mechanical adjusters comprises one or more x-axis adjusters operable to translate the telescope assembly along an x-axis with respect to the gimbal assembly.

8. The telescope system of claim 1, wherein the plurality of mechanical adjusters comprises one or more y-axis adjusters operable to translate the telescope assembly along a y-axis with respect to the gimbal assembly.

9. The telescope system of claim 1, wherein the plurality of mechanical adjusters comprises one or more z-axis adjusters operable to translate the telescope assembly along a z-axis with respect to the gimbal assembly.

10. The telescope system of claim 1, wherein the plurality of mechanical adjusters comprises at least one push/pull or push/push mechanism.

11. The telescope system of claim 1, wherein the telescope assembly further comprises a plurality of alignment targets operable to establish the system invariant point.

12. The telescope system of claim 11, wherein an alignment target comprises a reticle mirror with a plurality of hash marks associated with at least one of the input axis or the optical axis of the telescope assembly.

13. The telescope system of claim 12, wherein the alignment target is kinematically installed within an input port of the telescope assembly.

14. The telescope system of claim 12, wherein the plurality of alignment targets is positioned relative to at least one of the elevation axis or the azimuthal axis of the gimbal assembly.

15. The telescope system of claim 1, wherein the telescope assembly comprises: (i) a primary mirror assembly disposed proximate to a backend of the telescope assembly, (ii) a secondary mirror assembly disposed proximate to a frontend of the telescope assembly, and (iii) a tertiary mirror assembly disposed between the primary mirror assembly and the secondary mirror assembly.

16. The telescope system of claim 15, wherein the tertiary mirror assembly comprises a feature marking indicative of the telescope invariant point.

17. A method for establishing a system invariant point for a telescope system comprising a telescope assembly mounted to a gimbal assembly, the method comprising:
- positioning a telescope alignment sight over an alignment mechanism in the gimbal assembly, wherein the telescope alignment sight comprises an alignment target with one or more markings defining at least one of an input axis or an optical axis of the telescope assembly;
- initiating, using an alignment telescope, light through the telescope alignment sight and the alignment mechanism in the gimbal assembly; and adjusting a mounting position of the telescope assembly relative to the gimbal assembly based on a comparison between the alignment target and a feature marking disposed within the telescope assembly to establish the system invariant point, wherein the system invariant point is established by overlaying (a) an intersection between the input axis and the optical axis of the telescope assembly with (b) an intersection between an elevation axis and an azimuthal axis of the gimbal assembly.

18. A method for tracking a celestial object, the method comprising:

establishing a system invariant point for a telescope system comprising a telescope assembly mounted to a gimbal assembly, wherein the system invariant point is indicative of an overlapping (i) telescope invariant point for the telescope assembly and (ii) gimbal invariant point for the gimbal assembly, wherein the system invariant point is established by overlaying (a) an intersection between an input axis and an optical axis of the telescope assembly with (b) an intersection between an elevation axis and an azimuthal axis of the gimbal assembly; and measuring a distance between the celestial object and the telescope system based on the system invariant point for the telescope system.

* * * * *